United States Patent Office 2,920,758
Patented Jan. 12, 1960

2,920,758
PROTECTIVE COVER

Richard G. Woolworth, Lancaster, Pa., assignor to Animal Trap Company of America, Lititz, Pa., a corporation of Pennsylvania Application February 12, 1958, Serial No. 714,904

8 Claims. (Cl. 206—46)

This invention relates to the provision of protection for automobile doors or other structures during shipment. More particularly, it relates to providing protection for the outer panels of automobile doors.

Automobile doors are commonly shipped unpainted and it is desirable to protect the outer panels so that they will not be scratched during transit as scratches result in the appearance of blemishes in the panels after they are painted. Additionally, the edge portions of the outer panels, particularly the edge portion along the bottom of the outer panel, are highly susceptible to injury as a result of the rough handling incident to shipment, and accordingly, it is desirable to adequately protect these portions. Hence, it is a primary object of the invention to provide suitable protection for the outer panel edge portions, and to protect the exposed surfaces of the outer panel from contacts which would scratch or otherwise mar the panels.

A further object of the invention is to provide a shipping protector which is inexpensive to manufacture and which can be readily and conveniently applied to and removed from the door.

The nature, objects and advantages will be more fully understood from the following description, taken in connection with the accompanying drawings, in which.

Figure 2:
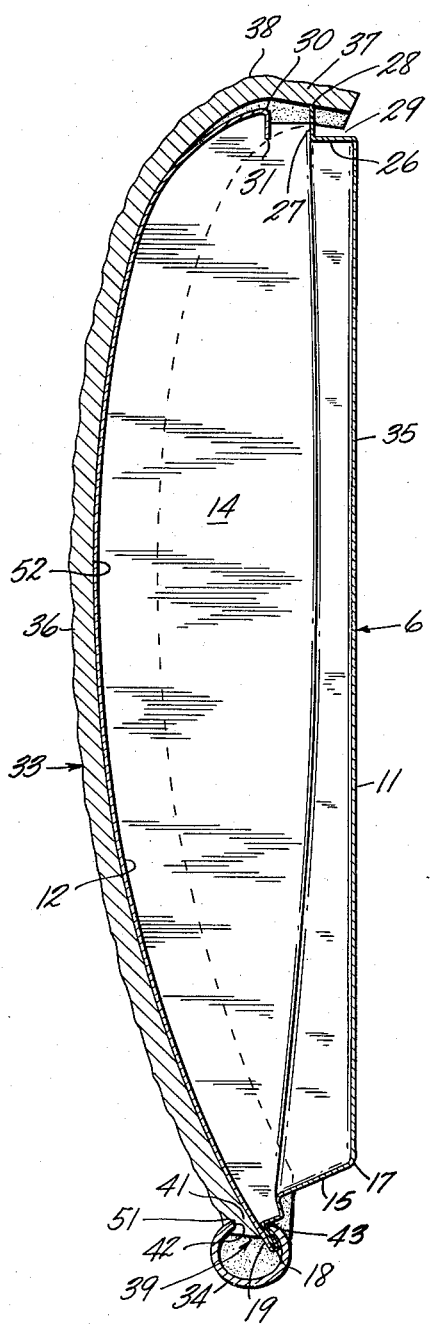
Fig. 2 is a cross-sectional view taken along line 2—2 of Fig. 1.
Figure 3:
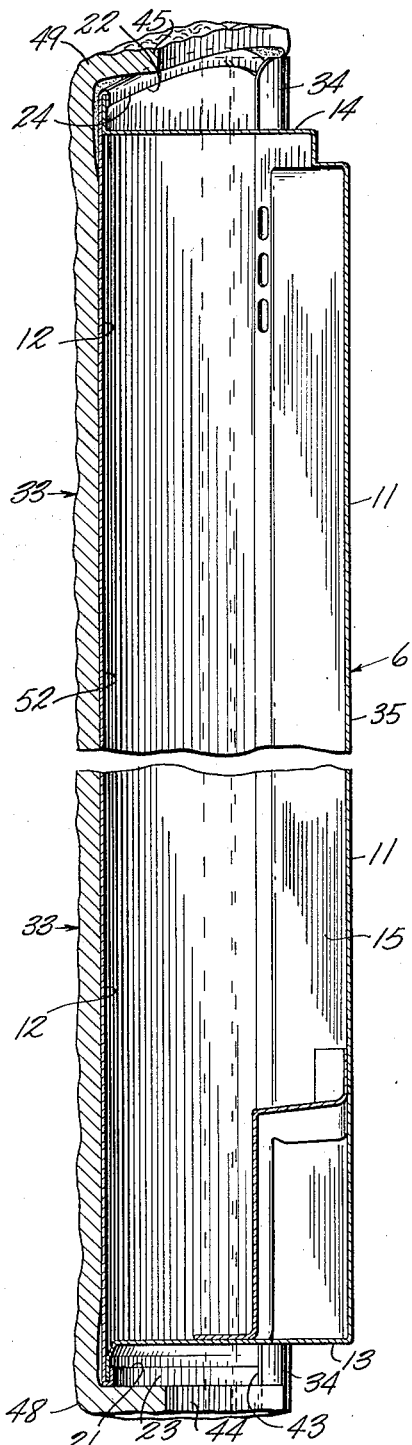
Fig. 3 is a cross-sectional view taken along line 3—3 in Fig. 1.

Referring to the drawings, there is shown an automobile door 6. The door is formed by an inner panel 11, outer panel 12 spaced from the inner panel and curving in toward the top and bottom of the inner panel, and front side wall 13, rear side wall 14, and bottom wall 15, respectively. As can be best seen in Fig. 2, the bottom wall 15 extends from the lower edge 17 of the inner panel 11 to the outer panel 12 terminating a short distance above the lower edge 18 of the outer panel so that an outer panel lower edge portion 19 projects down beyond the bottom wall 15. This lower edge portion is highly susceptible to injury during shipment and a feature of the invention, shortly to be described, is the manner in which this lower edge portion is protected. As is best seen in Fig. 3, the front side wall 13 and rear side wall 14 extend from the inner panel 11 to the outer panel 12 terminating a short distance inwardly of the outer panel front side edge 21 and rear side edge 22, respectively, and similarly form outer panel front side edge portion 23 and rear side edge portion 24 which extend beyond the front side wall 13 and rear side wall 14 of the door. These side edge portions are also susceptible to injury and in a preferred embodiment of the invention suitable protection is provided therefor, as will also shortly be described. At the top of the door, the inner panel 11 turns in toward the outer panel 12, forming a ledge 26, and then upwardly, forming a riser 27 terminating at inner panel upper edge 28. Thus, an outwardly disposed recess 29 is formed below the upper edge 28 of the inner panel, and on the outer panel side of the inner panel body portion 35. The outer panel 12 curves inwardly to upper edge 30 and then turns downwardly to form a lip 31 which is spaced from inner panel upper edge 28 thus providing for insertion of a door window between the panels. Adjacent the door front and rear side walls 13 and 14, respectively, the outer panel upper edge portion and inner panel upper edge portion are joined together by top wall members (not shown) and adjacent the front side of the door, a window frame post 32 projects upwardly above the top of the door.

According to the invention, the door 6 is provided with a shipping protector comprising a cover 33 for outer panel 12 and a resilient tube 34 protecting the outer panel lower edge portion 19. The cover 33 includes a body portion 36 which conforms in contour to the outer panel 12 and is of about the same outline and dimensions as the outer panel, and a protecting and retaining member 37 disposed along an inwardly curved upper edge portion 38 of the body portion 36. The retaining member 37 is shown integrally formed with the body portion 36 and comprises a plane extension extending inwardly and slightly downwardly from the body portion and engaging the upper edge 28 of inner panel 11. The retaining member extends beyond the upper edge 28 and terminates below the level thereof in the recess 29. The cover is of sufficient thickness to be shape-retaining, the thickness being approximately uniform.

Figure 1:
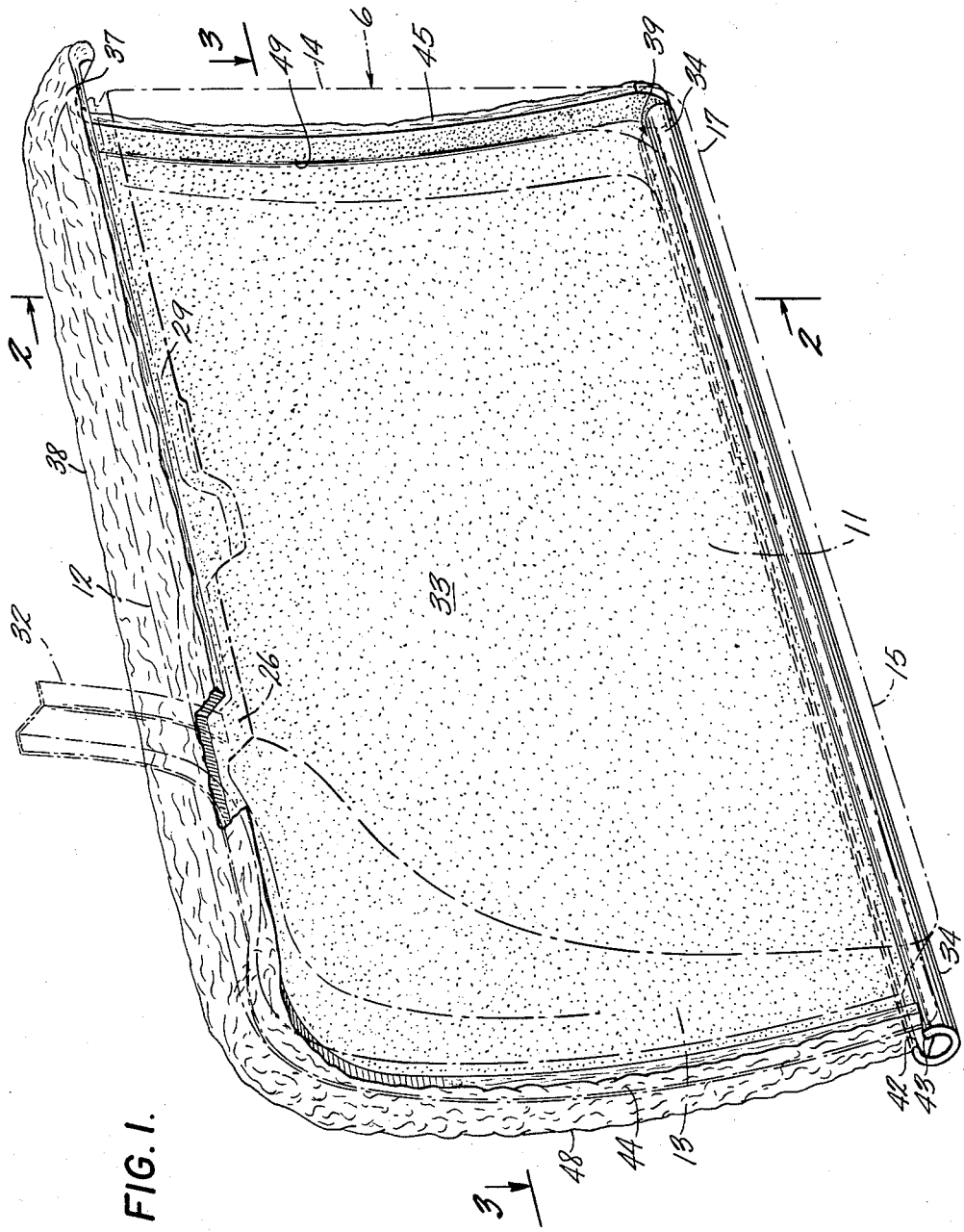
Fig. 1 is a perspective view of a shipping protector according to the invention positioned on an automobile door which is shown in phantom.

The resilient tube 34 is provided with a slot or slit 39 (Fig. 1) extending axially along the entire length thereof and receiving the outer panel lower edge portion 19 and the lower edge portion 41 of the cover 33. The tube 34 resiliently grips the lower edge portions of the cover and outer panel between the axially extending edges 42 and 43 defining the slit 39, and protects the outer panel lower edge portion 19 and cooperates with the retaining member 37 to secure the cover on the door.

Advantageously, the cover 33 includes side flange members 44 and 45 disposed respectively along front side edge 48 and rear side edge 49 of the cover body portion 36 and formed integrally with the body portion, extending inwardly therefrom so as to provide protection for the front outer panel side edge 23 and rear outer panel side edge 24, respectively. The side members 44 and 45 engage the edges 23 and 24 of the outer door panel and assist in holding the cover on the door.

In a preferred embodiment of the invention, and as is shown in the drawings, a groove 51 is disposed along the lower edge portion 41 of the cover body portion and receives axially extending edge 42 of the slit in the tube 34. As will be readily apparent from inspection of Fig. 2, this feature insures that the tube will not become dislodged. Moreover, the lower end of the side flange 45 extends downwardly to form an abutment for the end of the tube.

The cover 33 is molded pulp made by immersing a screen shaped into the form of the outer panel in an aqueous pulp slurry containing a binder, and then drawing a vacuum on the screen to deposit pulp thereon. Enough pulp is deposited on the screen so that the cover will be of sufficient thickness and rigidity to be shape-retaining and will provide adequate protection for the door panels, the wet pulp mass is then dried and removed from the screen form. A pulp thickness of the order of one-half inch is generally satisfactory. Inturned flange portions 37, 44 and 45 further rigidify the cover. The screen used in the molding process is of sufficiently fine mesh so that the inner surface 52 of the cover which contacts the outer panel is substantially smooth and hence will not scratch the surface of the outer panel. The tube 34 is advantageously formed of paper of greater than about one-fourth inch thickness. If desired, the cover and tube can be impregnated or coated with a bonding or water proofing material, for example a synthetic resin or other plastic composition.

The shipping protector may be installed on an automobile door by sliding it over the door front panel from above the door so that the retaining member 37 engages the upper edge of the inner or outer panel and then forcing the tube into place by sliding it endwise over the outer panel lower edge portion and the cover lower edge portion from either the forward or rear side of the door. Advantageously, however, and particularly when the cover retaining member 37 is in the form of a plane as shown in the drawings, the cover can be installed by moving it into place from a position in which it confronts the door outer panel by slipping the retaining member over the top of the door whereupon it will snap into place engaging the outer or inner panel upper edge. Thus, structure, such as window frames, disposed above the door panels need not interfere with installation of the cover.

While the cover has been described as protecting a car door, it will be understood that its shape and size may be suitably modified to protect other structures.

What I claim and desire to secure by Letters Patent is:

1. A shipping protector for an automobile door including an inner panel having an upper edge and an outer panel having upper and lower edges and including an upper portion that curves in toward said inner panel and a lower edge portion that projects downwardly beyond said inner panel, said protector comprising a molded pulp cover for the outer panel having a body portion conforming in contour to said outer panel and of about the same outline and dimensions as said outer panel and a further having a retaining member disposed along the upper edge of said body portion integrally formed therewith and extending outwardly and downwardly therefrom for engagement with the upper edge of one of said panels, said cover being of sufficient thickness and rigidity to be shape-retaining and the body portion thereof having a substantially smooth inner surface for contact with the outer panel, and a resilient tube having a slit extending axially along the entire length thereof for receiving said outer panel lower edge portion and the lower edge portion of said cover and resiliently gripping said lower edge portions between the axially extending edges defining said slit, said tube protecting the lower edge portion of the outer panel and cooperating with said retaining member of said cover to secure the cover on the door.

2. A shipping protector for an automobile door including an inner panel having an upper edge and an outer panel having upper, lower and side edges and including an upper portion that curves in toward said inner panel and a lower edge portion that projects beyond said inner panel, said protector comprising a molded pulp cover for the outer panel having a body portion conforming in contour to said outer panel and of about the same outline and dimensions as said outer panel and a retaining member disposed along the upper edge of said portion integrally formed therewith and extending inwardly and downwardly therefrom for engagement with the upper edge of one of said panels and a side member disposed along each side edge of said body portion integrally formed therewith and extending inwardly therefrom for protecting said outer panel side edges, said cover being of sufficient thickness and rigidity to be shape-retaining and the body portion thereof having a substantially smooth inner surface for contact with the outer panel, and a resilient tube having a slit extending axially along the entire length thereof for receiving said outer panel lower edge portion and the lower edge portion of said cover and resiliently gripping said lower edge portions between the axially extending edges defining said slit, said tube protecting the lower edge portion of the outer panel and cooperating with said retaining member of said cover to secure the cover on the door.

3. A shipping protector according to claim 2, the lower edge portion of the cover body portion having a groove for receiving one of the axially extending edges defining the slit in said tube.

4. A shipping protector according to claim 3, said tube being formed of paper.

5. The combination of an automobile door comprising an inner panel having a body portion and an upper edge and an outer panel having upper and lower edges and including a lower edge portion that projects beyond said inner panel, said inner panel adjacent the upper edge thereof turning inwardly and extending upwardly to said upper edge forming an outwardly disposed recess below said upper edge and on the outer panel side of the inner panel body portion, and a shipping protector for said door comprising a molded pulp cover for the door outer panel, said molded pulp cover having a body portion conforming in contour to and overlying the door outer panel being of about the same outline and dimensions as said outer panel, said molded pulp cover further having a retaining member disposed along the upper edge of the cover body portion integrally formed therewith and comprising a flange portion extending inwardly and downwardly therefrom engaging said upper edge of said inner panel and terminating in said recess, said cover being of sufficient thickness and rigidity to be shape-retaining and the body portion thereof having substantially smooth inner surface in contact with the outer panel, and a means receiving said outer panel lower edge portion and the lower edge portion of said cover and protecting the lower edge portion of the outer panel and cooperating with the retaining member of said cover to secure the cover on the door.

6. A shipping protector for a contoured panel structure having edges, said protector comprising a molded pulp cover fitting over said panel and conforming in contour to said panel and of approximately the same size and shape as said panel, said cover being of sufficient thickness and rigidity to be shape-retaining and having an integral inturned edge portion hooking over an edge of said panel and a resilient tube having a slit extending longitudinally thereof and defined by longitudinally extending edges, said tube fitting over edge portions of said cover and panel opposite said inturned edge portion, and gripping said edge portions of the cover and panel between the edges of said slit, the tube cooperating with said opposite inturned edge portion of the cover to secure the cover on the panel.

7. A shipping protector according to claim 6, in which said cover has further inturned edge portions engaging edges of said panel extending between said first mentioned inturned edge portion and said tube.

8. A shipping protector for an automobile door including an inner panel having an upper edge and an outer panel having upper and lower edges and including an upper portion that curves in toward said inner panel and a lower edge portion that projects downwardly beyond said inner panel, said protector comprising a molded pulp cover for the outer panel having a body portion conforming in contour to said outer panel and of about the same outline and dimensions as said outer panel and further having a retaining member disposed along the upper edge of said body portion integrally formed therewith and extending outwardly and downwardly therefrom for engagement with the upper edge of one of said panels, said cover being of sufficient thickness and rigidity to be shape-retaining and the body portion thereof having a substantially smooth inner surface for contact with the outer panel, and means for receiving said outer panel lower edge portion and the lower edge portion of said cover and protecting the lower edge portion of the outer panel and cooperating with the retaining member of said cover to secure the cover on the door.

References Cited in the file of this patent

UNITED STATES PATENTS

| | | |
|---|---|---|
| 741,362 | Ohnstrand | Oct. 13, 1903 |
| 1,158,438 | Buch | Nov. 2, 1915 |
| 2,551,374 | Hansen | May 1, 1951 |
| 2,807,356 | Blum | Sept. 24, 1957 |

FOREIGN PATENTS

| | | |
|---|---|---|
| 333,411 | Great Britain | Aug. 14, 1930 |